United States Patent [19]
Pond

[11] 3,862,988
[45] Jan. 28, 1975

[54] 4,8-DIMETHYL-12-OXOTRIDECANAL
[75] Inventor: David M. Pond, Kingsport, Tenn.
[73] Assignee: Eastman Kodak Company, Rochester, N.Y.
[22] Filed: May 23, 1974
[21] Appl. No.: 472,793

[52] U.S. Cl. .......................... 260/593 R, 260/343.9
[51] Int. Cl. ............................................. C07c 49/04
[58] Field of Search ................................ 260/593 R

[56] References Cited
OTHER PUBLICATIONS
Beilsteins Handbook, Vol. I, 3rd supplmt., part 3, pp. 3,153–55 (1959).

Mayer et al., Helvetica Chimica Acta, Vol. 46, pp. 963–82 (1963).

Primary Examiner—Leon Zitver
Assistant Examiner—James H. Reamer
Attorney, Agent, or Firm—Elliott Stern, Daniel B. Reece III

[57] ABSTRACT

The new compound 4,8-dimethyl-12-oxotridecanal which is useful in the preparation of phytone, a valuable intermediate in the preparation of Vitamin E.

1 Claim, No Drawings

4,8-DIMETHYL-12-OXOTRIDECANAL

This invention relates to a novel compound 4,8-dimethyl-12-oxotridecanal which is useful for preparing phytone, a valuable intermediate in the synthesis of Vitamin E.

It has been found that 6,10,14-trimethylpentadecan-2-one (phytone) can be prepared from 4,8-dimethyl-12-oxotridecanal in two steps via the synthetic route set forth below.

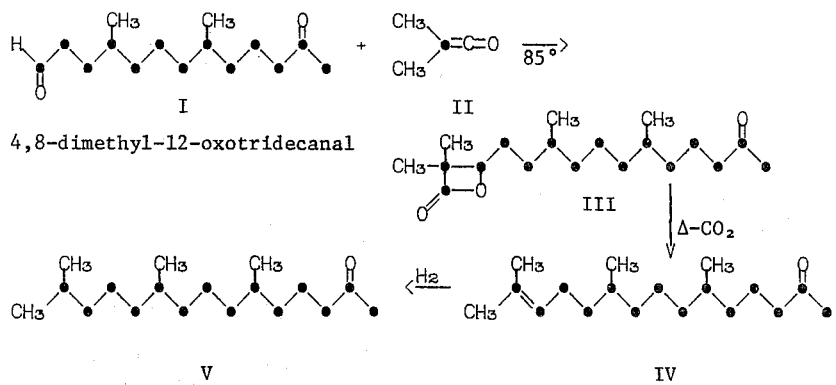

I  4,8-dimethyl-12-oxotridecanal

II

III

IV

V  6,10,14-trimethylpentadecan-2-one (phytone)

The starting material (I) 4,8-dimethyl-12-oxotridecanal, the novel compound of this invention, may be prepared in two simple steps from 1,5,9-trimethyl-1,5,9-cyclododecatriene (See U.S. Pat. No. 3,429,940). For example, 1,5,9-trimethyl-1,5,9-cyclododecatriene, 2-butanol, 2-butanone and Raney nickel may be heated at 200° for 12 hours in an autoclave under about 350 psi. of nitrogen. The catalyst may then be removed by filtration. Distilliation of the product provides 1,5,9-trimethylcyclododecene. The 1,5,9-trimethylcyclododecene thus formed may then be added to a cooled solution containing methylene chloride and an alcohol such as isopropanol, treated with 3 percent ozone in an oxygen stream for about 3 hours, and subsequently treated with zinc dust in aqueous acetic acid. The layers may then be separated and the organic phase washed with dilute base and dried. Distillation gives the starting material and novel compound of this invention 4,8-dimethyl-12-oxotridecanal.

Phytone may then be prepared as follows:

A. cycloaddition of dimethylketene to 4,8-dimethyl-12-oxotridecanal at the aldehyde function to form the dimethylketene β-lactone adduct, the cycloaddition being effected at a temperature of from about 50°C. to about 100°C. in an inert atmosphere, in a polar solvent and in the presence of a catalyst selected from boron trifluoride etherate and zinc chloride;

B. thermal decarboxylation of the dimethylketene β-lactone adduct converting it into 6,10,14-trimethyl-13-pentadecen-2-one; and C. catalytic hydrogenation of the 6,10,14-trimethyl-13-pentadecen-2-one into phytone.

Any polar, non-nucleophilic solvent may be used in Step A. Examples of the polar solvents which may be utilized in Step A are the aliphatic esters such as isopropyl acetate, ethyl acetate, methyl acetate, isobutyl acetate, etc., the aliphatic ethers such as diethyl ether, dioxane, tetrahydrofuran and the like. Other polar solvents which may be used are acetonitrile and the chlorinated hydrocarbons such as chloroform, methylene chloride, dichloroethylene, etc., the aliphatic esters being the preferred solvents. Dimethylketene is known and may be prepared according to the method taught in H. Staudinger and H. W. Klever, Chem. Ber., 39, 968 (1906) or E. Wedekind and W. Weisswange, Chem. Ber., 39, 1631 (1906). The preferred cycloaddition catalyst used in this step is boron trifluoride etherate having the formula: $BF_3 \cdot Et_2O$. The thermal decarboxylation may be carried out in the manner known in the art. Preferably this step will be carried out at temperatures of above 150°C. As used herein, the dimethyl-β-lactone adduct refers to compound III in the above synthetic scheme, 3,3-dimethyl-4-(3,7-dimethyl-11-oxododecyl)oxetan-2-one. The third step in the process of this invention, e.g., the catalytic hydrogenation of the product prepared Step B into phytone may be carried out in a manner well known in the art. Any of the known hydrogenation catalysts be used to reduce the double bond moiety to give phytone. Examples of such catalysts are palladium-on-charcoal, Raney nickel, platinum oxide, etc.

The following examples further illustrate the invention.

EXAMPLE 1

Preparation of 4,8-Dimethyl-12-oxotridecanal

A solution containing 40.88 grams (0.2 mole) of 1,5,9-trimethyl-1,5,9-cyclododecatriene (cyclic isoprene trimer) prepared according to U.S. Pat. No. 3,429,940 (1969), 32.03. (0.43 mole) of 2-butanol, 30 ml. of 2-butanone, and 2.0 g. of Raney nickel catalysts (slurried into 2-butanol) was heated at 200°C. in a rocking autoclave under nitrogen pressure (350 psi.) for 12 hours. The catalyst was removed by filtration and distillation gave 38.5 g. (91 percent) of a colorless liquid (b.p. 103°–105°C. at 0.9 torr). Field ionization mass spectroscopy indicated that the material contained 84 percent 1,5,9-trimethylcyclododecene and its nmr and ir spectra was consistent with the proposed structure.

Ozone (0.03 mole of $O_3$/hr. in an oxygen stream) was passed (3.1 hours) through a solution which contained 21.0 g. (0.11 mole) of 1,5,9-trimethylcyclododecene in methylene chloride (50 ml.) and methanol (200 ml.) at −10°C. The solution was then transferred to a large flask and mixed with 100 ml. glacial acetic acid and 200 ml. water. With stirring, 6.6 g. (0.11 mole) of powdered zinc was added in small portions (exothermic reaction) over 0.5 hour. The layers were separated and the aqueous portion was washed with methylene chloride (100 ml.). The organic phases were combined, thoroughly washed with 5% $NaHCO_3$, washed with water, dried over magnesium sulphate and concentrated at reduced pressure. Distillation gave 17.40 g. (72.8 percent) of a colorless liquid (boiling range 110° to 150°C. at 0.7 torr.). Gas-liquid chromotography analysis confirmed that the distillate contained about 90 percent 4,8-dimethyl-12-oxotridecanal.

EXAMPLE 2

Preparation of Dimethylketene β-Lactone Adduct [3,-3-Dimethyl-4-(3,7-dimethyl-11-oxododecyl)oxetan-2-one]

Dimethylketene (6.0 ml.) 0.07 mole was added under the surface to a solution containing 12.0 g. (0.05 mole 4,8-dimethyl-12-oxotridecanal and 15 drops of boron trifluoride etherate ($BF_3.Et_2O$ and 125 ml. isopropyl acetate held at 85°C.). The yellow color of the dimethylketene disappeared immediately on addition. After stirring an additional 1 hour the reaction mixture was mixed with 100 ml. of water and the layers were separated giving the dimethylketene β-lactone adduct in the organic layer.

EXAMPLE 3

Preparation of 6,10,14-Trimethyl-13-pentadecene-2-one

The adduct prepared in Example 2 was transferred to a 300 ml. autoclave which was subsequently flushed with nitrogen, evacuated to 20 torr. and heated at 150° for 2 hours. The autoclave was opened and the ir spectrum of the solution indicated no β-lactone adduct remained. The reaction mixture was dried ($MgSO_4$) and distilled under reduced pressure to give an 82 percent yield of 6,10,14-trimethyl-13-pentadecene-2-one.

EXAMPLE 4

Preparation of Phytone (6,10,14-trimethylpentadecan-2-one)

A solution containing 1.10 g. (0.0038 mole) of the 6,10,14-trimethyl-13-pentadecene-2-one prepared in the previous example and 0.10 g. of 5 percent palladium on charcoal and 50 ml. of ethyl acetate was stirred under a hydrogen atmosphere (40 psi. $H_2$ at 60°C.) for 6 hours. Separation of the catalyst and subsequent distillation gave 1.01 g. (91 percent) of 6,10,1-4-trimethylpentadecane-2-one. (b.p. 105°–108°C. at 0.2 torr).

While the particular embodiments of the invention have been described for purpose of illustration it should be understood that various modifications and adaptions thereof may be made within the spirit of the invention as set forth in the appended claim.

I Claim:
1. 4,8-Dimethyl-12-oxotridecanal.

* * * * *